Sept. 12, 1950 M. LEHMANN 2,522,128
INDUSTRIAL TRUCK
Filed May 2, 1946 8 Sheets-Sheet 1

INVENTOR.
MAX LEHMANN.
BY Geo. B. Pitts
Attorney

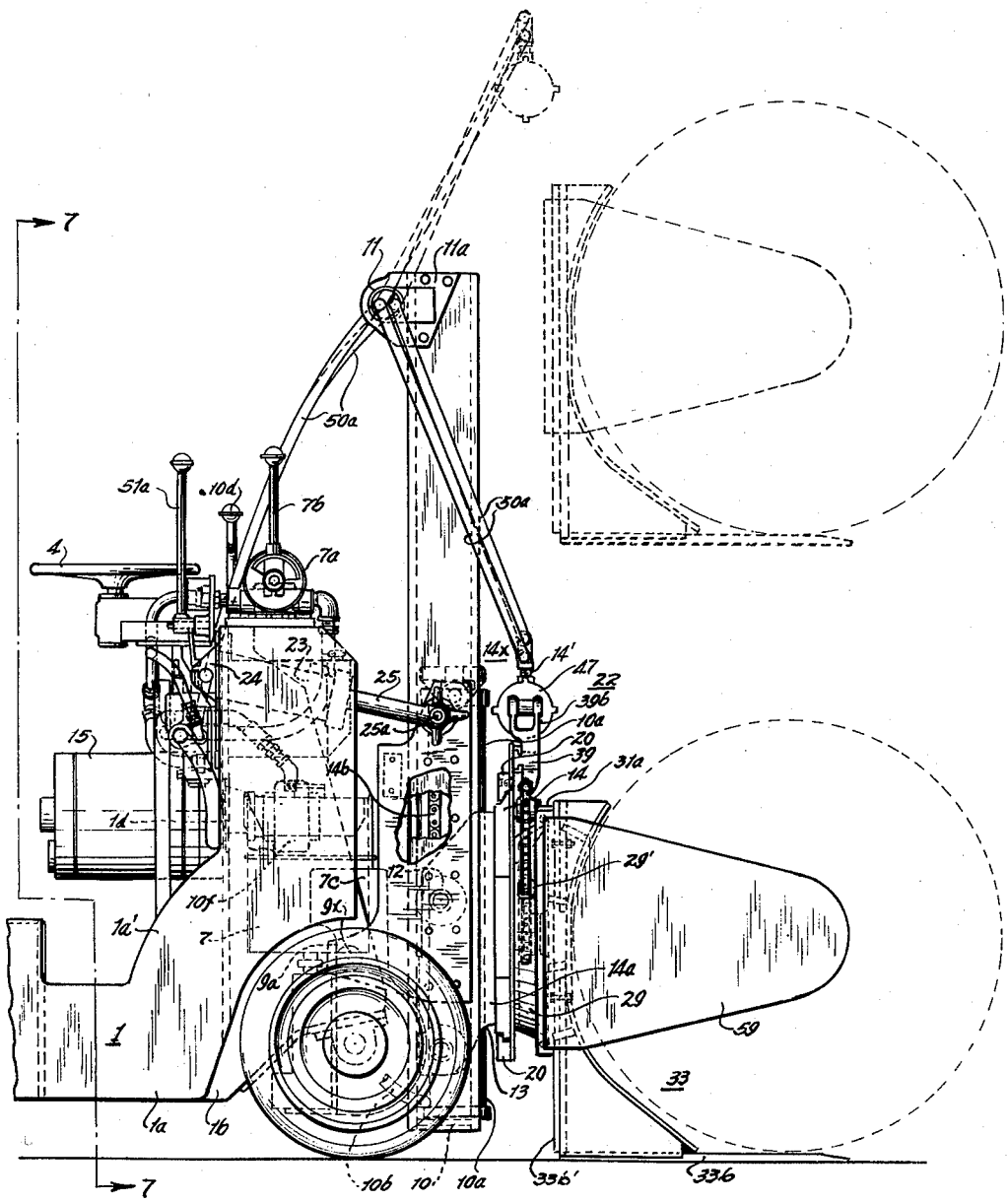

INVENTOR.
MAX LEHMANN.
BY Geo. B. Pitts
Attorney

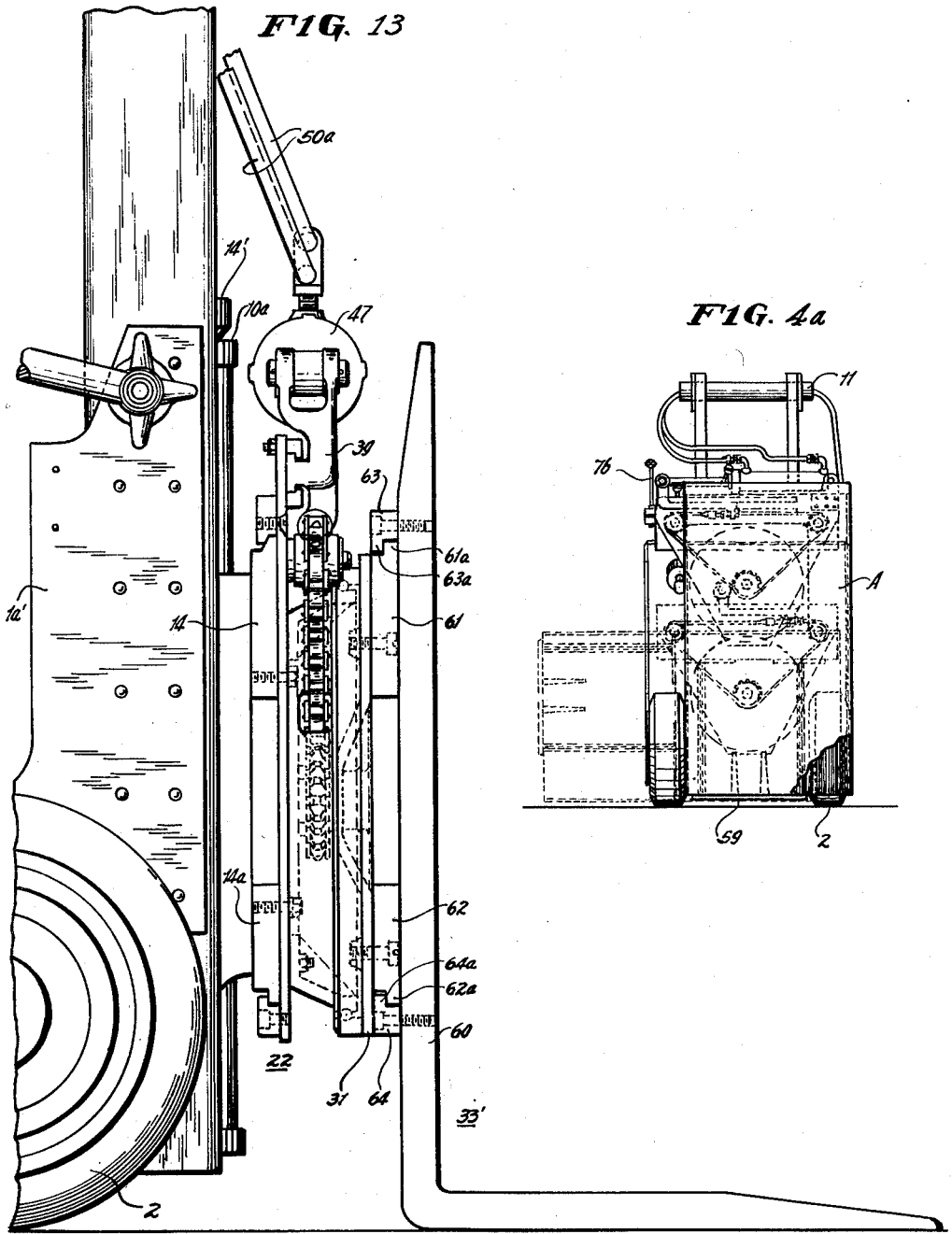

Sept. 12, 1950 M. LEHMANN 2,522,128
INDUSTRIAL TRUCK
Filed May 2, 1946 8 Sheets-Sheet 5
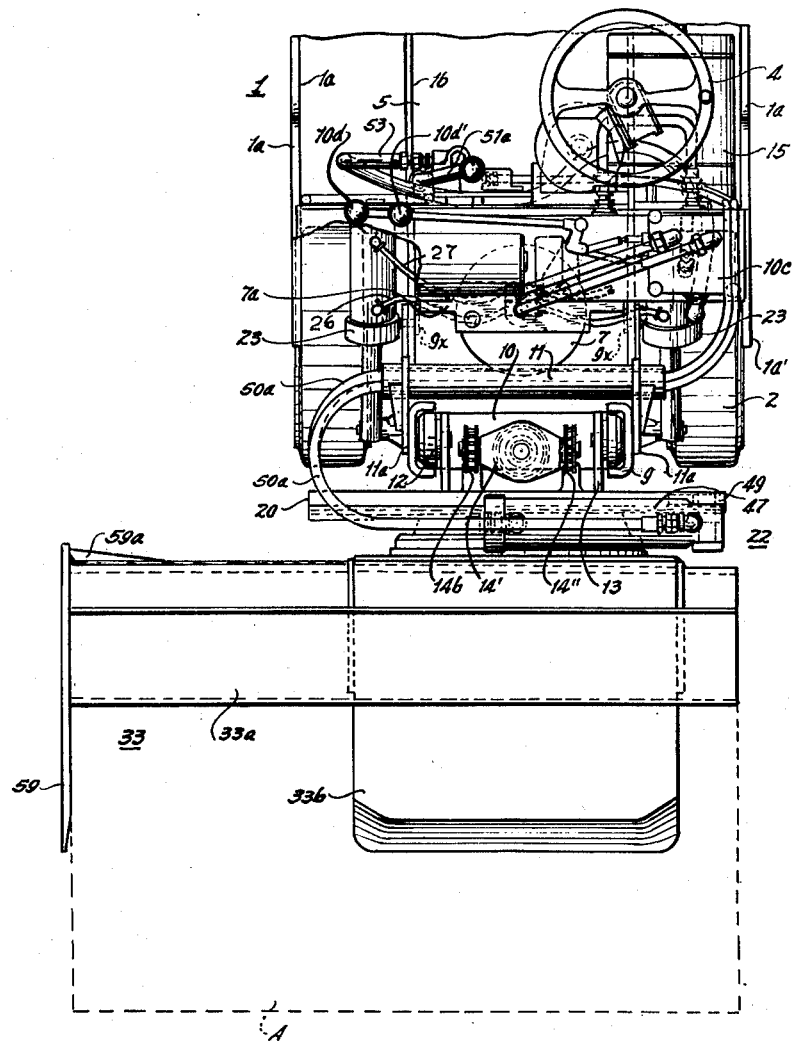
INVENTOR.
MAX LEHMANN.
BY Geo. B. Pitts
Attorney Sept. 12, 1950 M. LEHMANN 2,522,128
INDUSTRIAL TRUCK
Filed May 2, 1946 8 Sheets-Sheet 6
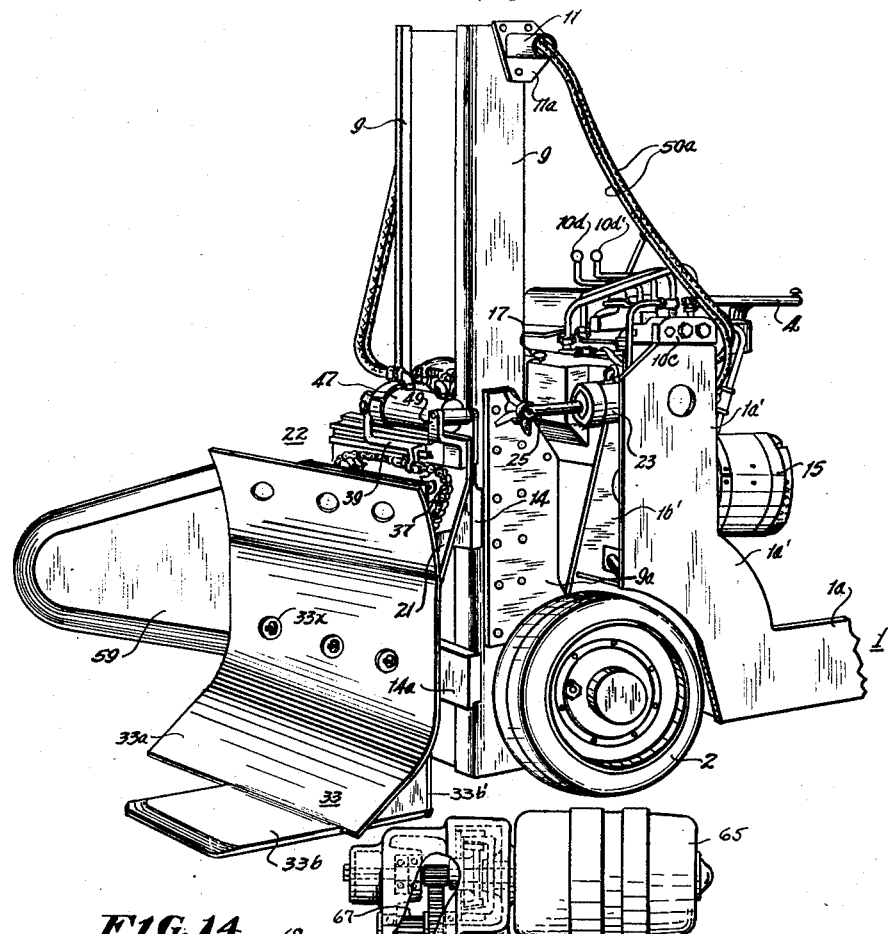
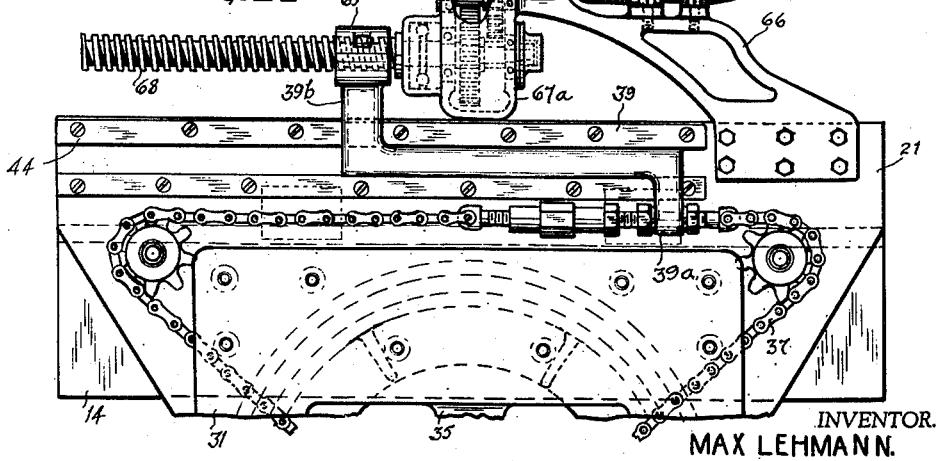
INVENTOR.
MAX LEHMANN.
BY Geo. B. Pitts
ATTORNEY.

Sept. 12, 1950  M. LEHMANN  2,522,128
INDUSTRIAL TRUCK
Filed May 2, 1946  8 Sheets-Sheet 7

INVENTOR.
MAX LEHMANN.
BY Geo. B Fitts
attorney

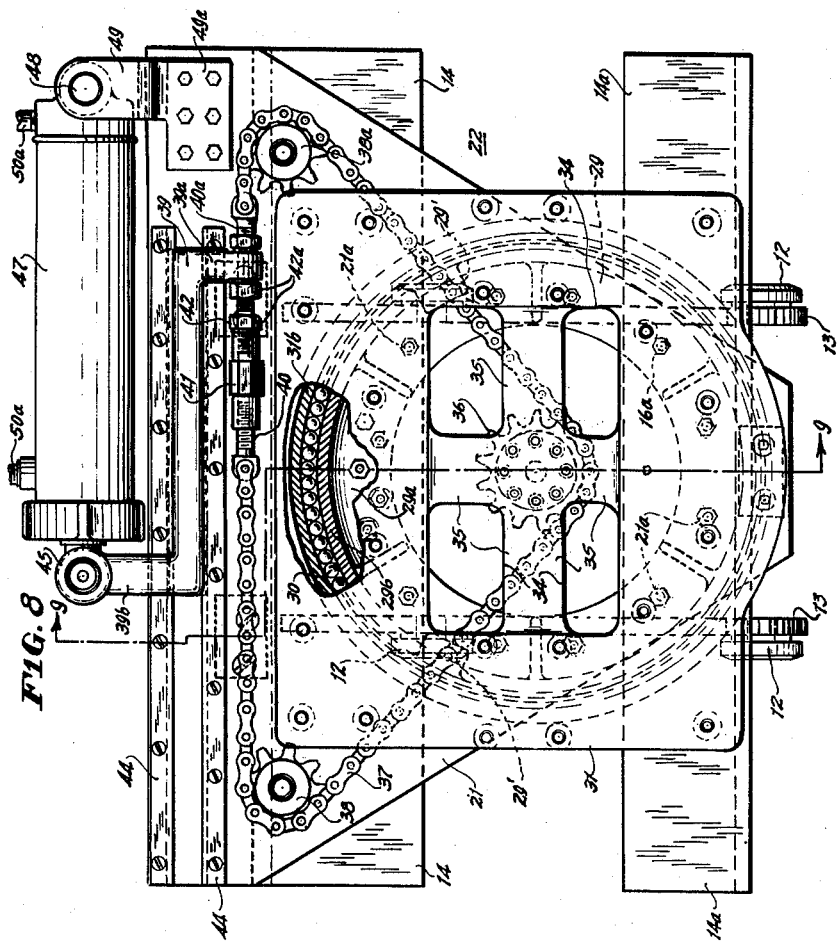

Patented Sept. 12, 1950

2,522,128

UNITED STATES PATENT OFFICE 2,522,128

INDUSTRIAL TRUCK

Max Lehmann, East Cleveland, Ohio, assignor to The Baker-Raulang Company, Cleveland, Ohio, a corporation of Ohio Application May 2, 1946, Serial No. 666,766

7 Claims. (Cl. 214—113)

This invention relates to an industrial truck having an elevating mechanism for handling loads, whereby the latter may be transported from place to place, as well as discharged onto or removed from supports disposed above the surface or flooring or where the loads are to be stacked or removed when in stacked relation.

One object of the invention is to provide an improved industrial truck of this character wherein the load carrier is mounted to rotate from one load carrying position to a load discharge or pick-up position to facilitate handling and transportation of loads.

Another object of the invention is to provide in a truck of this character having a rotatably mounted load carrier, improved means for operating the carrier from its load carrying position to a load discharge or pick-up position to eliminate manual labor and economically effect handling of loads under varying factory or warehouse conditions.

Another object of the invention is to provide an improved truck of this character having a mounting for the load carrier capable of rotatably supporting the latter in different load carrying positions and simplified operating means for the mounting arranged to readily control the movement of the latter to and from different operating positions.

Another object of the invention is to provide an improved truck of this character having a mounting for rotatably supporting a load carrier and means for operating the carrier from its horizontal position to and from a predetermined discharge position.

Another object of the invention is to provide in an industrial truck an improved load handling mechanism operable to pick up or discharge loads which require storing in one position but to transport such loads in another position in relatively close relation to the travel surface, whereby the truck, when loaded, may be safely driven and danger of the truck tipping or getting out of control is avoided.

Another object of the invention is to provide an improved industrial truck of this character wherein the elevating mechanism is provided with a rotatable member adapted to removably support a load carrier, whereby different types of carriers, dependent on the shape or character of the loads to be handled, may be mounted on the member for transportation.

Another object of the invention is to provide in an industrial truck having an elevating mechanism which supports a rotatable load carrier, improved means for rotating the carrier.

Another object of the invention is to provide in an industrial truck having an elevating mechanism which supports a rotatable load carrier, improved hydraulic means for rotating the carrier capable of being regulated to rotate the carrier a predetermined distance.

A further object of the invention is to provide for a truck of this type an improved load carrying mechanism consisting of a support mounted on the elevating mechanism of the truck, a carrier rotatably mounted on the support and power means on the support drivingly connected to the carrier.

A still further object of the invention is to provide for a truck of this type a load carrying mechanism mounted on the elevating member of the truck and an improved power operated removable, rotatable carrier whereby the latter may be replaced with another carrier to adapt the truck to the handling of different kinds of loads.

Other objects of the invention will be apparent to those skilled in the art to which my invention relates from the following description taken in connection with the accompanying drawings, wherein:

Fig. 3 is a fragmentary side view of the truck, enlarged.

Fig. 4a is a view similar to Fig. 4 but showing a paper roll mounted on the carrier and the latter rotated and supporting the roll on one end.

Fig. 5 is a plan view of the parts shown in Figs. 3 and 4.

Fig. 6 is a fragmentary perspective view of parts shown in Figs. 3, 4 and 5.

Fig. 8 is an elevational view of the power mechanism for supporting and rotating a load carrier.

Fig. 9 is a section on the line 9—9 of Fig. 8.

Fig. 13 is a fragmentary side elevation of the truck shown in Figs. 11 and 12, enlarged.

Fig. 14 is a fragmentary view showing a modification.

Figure 2:
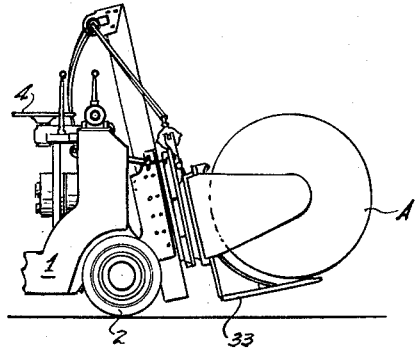
Fig. 2 is a fragmentary side view of parts shown in Fig. 1 but showing the elevating mechanism in tilted position.

In the drawings, 1 indicates as an entirety a chassis of any desired construction mounted on front wheels 2 and rear wheels 3. The rear wheels 3 are swingably mounted and connected through suitable connections (not shown) to a device 4 (preferably a wheel), whereby the truck may be steered. The chassis consists of outer side plates 1a and a plate 1b inwardly of and spaced from each outer plate. The plates 1a, 1b, at their front ends are provided with upwardly disposed extensions 1a', 1b', which support various parts later referred to, and a plate 5 to provide a control station for an operative (see Fig. 1) and a support for a housing 6. The front wheels 2 are fixed to axles within sleeves 2a (see Fig. 7) and drivingly connected to a transmission mechanism within a housing 2b, the transmission mechanism in turn being drivingly connected to the shaft of a motor 7.

As later set forth, the truck is provided with an elevating member and the guiding members therefor are swingably mounted. In trucks of this type it has been the practice to operate the travel motor and the motors for operating the elevating member and other movable parts or mechanisms by power derived from electric storage batteries or an internal combustion engine, dependent upon the operating conditions when the truck is placed in use or for other reasons; and while I have, for illustrative purposes provided batteries 6' within the housing 6, as the means for supplying power to the travel motor 7 and the other motor with which the truck is equipped, it will be obvious that the power supply may consist of an internal combustion engine when found desirable. The supply of current to the motor 7 is controlled by a suitable controller 7a having an operating handle 7b. The motor 7 is fixed to an arcuate wall 7c, which is formed integrally with and extends upwardly from one wall of the transmission housing 2b, an opening being formed in a cross plate 8 to accommodate the motor. 9 indicates a pair of spaced upright members having at their lower ends inwardly extending arms 9a, preferably mounted to swing rearwardly (as shown in Fig. 2) and back to a substantially upright position, as later set forth on pivots 9x supported in the extensions 1b' (see Fig. 5). The members 9 are rigidly connected at their lower ends by a cross member 10 (see Figs. 4 and 5) and at their upper ends by a hollow member 11 which is connected at its opposite ends to the members 9 by brackets 11a. The members 9 are of channel shape in cross section, the side walls thereof forming guides for upper and lower rollers 12. The shafts for the adjacent upper and lower rollers related to each guide member 9 are carried by a plate 13 disposed within and parallel to the adjacent guide member. The plates 13 are rigidly connected together by upper and lower supporting elements 14, 14a; these elements and the plates 13 forming an elevating member adapted to be raised by suitable power means, preferably of the hydraulic type, indicated as an entirety at 14x, which may be similar in construction to that shown in the copending application of Paul E. Hawkins, filed Oct. 4, 1944, Ser. No. 557,172, now Patent No. 2,471,429 granted May 31, 1949. The cylinder 10a for the power means 14x is mounted on the cross member 10 and connected by a conduit 10b with a suitable valve mechanism in a casing 10c having an operating handle 10d. The liquid is supplied to the valve mechanism through a pipe 10e connected, as later set forth, to the outtake port of a suitable pump 10f, which is driven by a motor 15. The motor 15 is supplied with current from the batteries. The intake side of the pump 10f is connected by a pipe 16 with the bottom of a liquid containing tank 17. The liquid is supplied from the valve mechanism to the lower end of the cylinder 10a to effect pressure on the piston therein, the piston having a rod connected at its upper end to a cross head 14'. The cross head 14' supports a pair of sprockets 14" which are engaged by chains 14b. The inner ends of the chains are suitably anchored to the cross member 10 (see Fig. 4), whereas their outer ends are fixed to anchors 14c carried by the supporting element 14a, so that when the piston is operated upwardly the elevating member is raised (see dotted lines in Fig. 1). The downward movement of the elevating member is effected by gravity, the piston in the cylinder 10a serving to force the liquid in the cylinder 10a through the conduit 10b, the valve mechanism and a return pipe 18 to the tank 17.

The upper edge of the upper supporting element 14 is cut away from end to end to provide an upwardly extending flange 19 and the lower edge of the supporting element 14a is cut away from end to end to provide a downwardly extending flange 19x (see Fig. 9). The flanges 19, 19x, are removably engaged by complementary shaped keys 20, suitably fixed to an inner wall 21, which supports parts of a hydraulically operated mechanism, indicated as an entirety at 22, as later set forth. The engagement of the keys 20 with the flanges 19, 19x, is effected by sliding them endwise along the latter to position the mechanism 22 in symmetrical relation to the guide members 9. Following the positioning of the mechanism 22, the wall 21 may be rigidly secured to the supporting elements 14, 14a, by bolts and screws 21a.

As later set forth, the mechanism 22 includes a rotatably mounted load carrier, but where this form of mechanism is not required it may be bodily removed and a load carrier of any desired construction substituted therefor.

Figure 1:
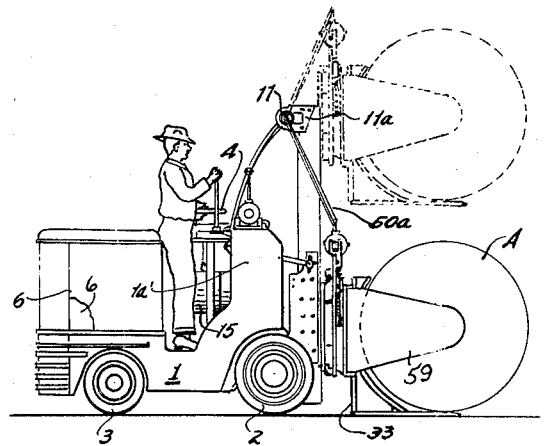
Fig. 1 is a side view of an industrial truck, somewhat diagrammatic, embodying my invention.
Figure 7:
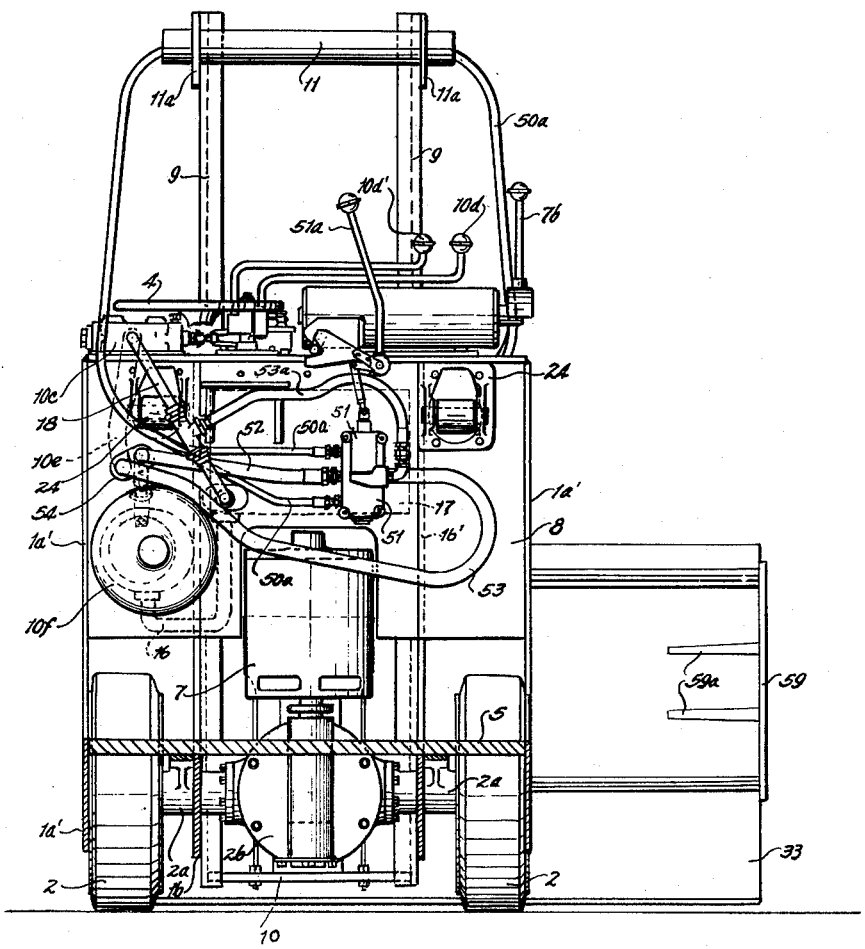
Fig. 7 is a section on the line 7—7 of Fig. 3.

The means for swinging or tilting the guide members 9 to the position shown in Fig. 2 and back to normal position, as shown in Fig. 1, consist of the following: 23 indicates a pair of cylinders suitably trunnioned at their inner ends on standards 24 fixed to the wall 8 which is rigidly connected to the extensions 1a', 1b' (see Fig. 7). The wall 8 is formed with enlarged openings through which the cylinders 23 project and swing due to the tilting of the members 9. Each cylinder 23 is provided with a reciprocatable piston having a rod 25, the outer end of which is pivotally connected to the adjacent guide member 9, as shown at 25a. The outer ends of the cylinders 23 are connected by pipes 26 to a second suitable valve mechanism in the casing 10c and the inner ends of the cylinders are connected by pipes 27 to the second valve mechanism in the casing 10c, these mechanisms being controlled by a handle 10d' and constructed to supply liquid under pressure simultaneously to corresponding ends of the cylinders 23 at one side of the pistons therein and simultaneously permit discharge of the liquid from the other ends of the cylinders to and through the valve mechanisms to the return pipe 18, which is connected to the supply tank 17 (see Fig. 7). In this arrangement, the guide members 9 are positively operated to their tilted position (Fig. 2) and positively operated to their upright or normal position (Fig. 1).

The mechanism 22 consists of the following: 29 indicates an annular member provided on its inner end with a circumferential flange 29a which is suitably secured to the inner wall 21. At its outer end the side wall of the member 29 is formed with a circumferential groove 29b of arcuate shape in cross section to provide a race for a series of balls (anti-friction elements) 30 on which an outer member or wall 31 is rotatably mounted, the wall 31 being provided with an inwardly extending side wall 31a which is formed on its inner face with a circumferential groove 31b of arcuate shape in cross section to provide a race for the balls 30. To permit the assembly of the balls in position, the side wall of the member 29 is cut-away as shown at 32 and the wall 31a is cut-away as shown at 32a, so that by rotating the wall 31 (prior to the assembly of the chain which is later referred to) the cut-aways may be related to form an opening through which the balls 30 may be inserted. The wall 31 is rigidly connected to and forms a support for a load carrier indicated as an entirety at 33, as later set forth. The inner portions of the wall 31 are formed with spaced openings 34 to permit access within the member 29, the wall 31 between the openings 34 providing angularly related arms 35 integrally connected together at their inner ends to form, axially of the wall 31 and on the inner side thereof, a seat 35a for a sprocket 36. As shown in Fig. 9, the sprocket 36 is rigidly but removably secured to the seat 35a by screws 36a. 37 indicates an endless chain engaging the sprocket 36 and spaced sprockets 38, 38a, rotatably mounted on shafts supported on the wall 21 in a plane above the sprocket 36, so that by driving the chain in one direction the load carrier is rotated any predetermined angular distance and by reversing the direction of movement of the chain the load carrier may be returned to its first position. The arms 35 are inclined inwardly relative to the outer portions of the wall 31 so as to support the sprocket 36 in a plane intermediate the inner and outer ends of the annular member 29 and mount the chain 37 on the inner side of the wall 31. The side wall of the member 29 is formed with openings 29' through which the chain 37 extends. The chain 37 is preferably of sectional form so that its effective length may be adjusted and provision may be made for connecting the chain to a reciprocatable power operated member 39. For these purposes adjacent links of the chain in the run between the sprockets 38, 38a, are pivotally connected to the outer ends of right and left hand threaded rods 40, 40a, the inner ends of which are threaded into the opposite ends of a connector 41. Accordingly, by rotating the connector 41 the effective length of the chain 37 may be adjusted to take up slack therein or adapt it to running engagement with the sprockets 36, 38 and 38a. The connector 41 is locked by a jam nut 42 threaded on the rod 40a. 42a, 42a, indicate nuts threaded on the rod 40a and tightened against the opposite sides of an arm 39a fixed to and depending from one end of the power operated member 39. The member 39 is provided on its inner side with a shoe 43 which slidably engages a pair of guides 44 secured to the inner wall 21 and extending parallel to the run of the chain 37 between the sprockets 38, 38a. The opposite end of the member 39 is provided with an upwardly extending arm 39b, which is pivotally and removably connected to a hollow boss 45 mounted on the outer end of a rod 45a. The inner end of the rod 45a is suitably secured to a piston 46 reciprocatable in a cylinder 47. The boss 45 is formed integrally with a shank 45b which is externally threaded and removably threaded into an opening 45c formed in the outer end of the rod 45a, whereby the effective length of the rod 45a may be adjusted with respect to the connection of the member 39 with the chain 37. That head 47a of the cylinder 47 remote from the head 47b through which the rod 45a moves, is shaped to provide an integral boss 47c through which a pivot pin 48 extends, the pin being supported in spaced arms 49 provided on a bracket 49a which is suitably supported on the inner wall 21.

From the foregoing description it will be observed that the outer end of the cylinder 47 is pivotally supported by the bracket 49a, whereas its inner end is supported through the piston rod 45a and arm 39b by the member 39. Accordingly, the inner end of the cylinder 47 is swingable in its plane, to avoid stresses on the connection between the member 39 and piston rod 45a incident to vibrations transmitted through the chain 37 to the member 39 due to starting or stopping of rotation of the load carrier. The liquid under pressure is supplied to the cylinder 47 at opposite sides of the piston 46; that is, the liquid is supplied to one side of the piston 46 and simultaneously discharged from the opposite side thereof to move the piston in one direction and then the liquid supply and discharge are reversed to effect movement of the piston in the opposite direction. By preference, the supply of liquid to each side of the piston when it is to be moved in one direction and its discharge from the same side thereof when the piston is moving in the opposite direction takes place through a single opening 50, suitably removably connected to a flexible pipe 50a, which leads from a suitable valve mechanism 51. As shown in Figs. 1 to 7, inclusive, the pipes 50a extend through and are supported intermediate their ends by the hollow member 11, to accommodate the up and down movement of the mechanism 22 when the mechanism 14x is operated. The liquid under pressure is supplied from the pump 10f through a pipe 52 to the valve mechanism 51; when the latter mechanism is in normal position the liquid flows therethrough and a pipe 53 to a fitting 54, which in turn is connected by the pipe 10e with the valve mechanisms in the casing 10c. The valve mechanism 51 is operated in either direction through a linkage 51' by a handle 51a. When the valve mechanism 51 is operated to move the piston 46 in either direction, the liquid flows through one of the pipes 50a to the pressure side of the piston 46 and is discharged from the opposite side thereof and flows through the other pipe 50a to the valve mechanism 51 and from the latter through pipe 53a to the pipe 18 for return to the tank 17.

By preference, the circuit from the batteries to the motor 15 includes three switches (not shown) each associated with and operatively connected to one of the handles 10d, 10d', 51a, so that when any one of the handles is operated the adjacent switch is operated to close the circuit and start the motor 15 and drive the pump 10f to establish pressure in the cylinder or cylinders related to the handle that is operated.

Figure 10:
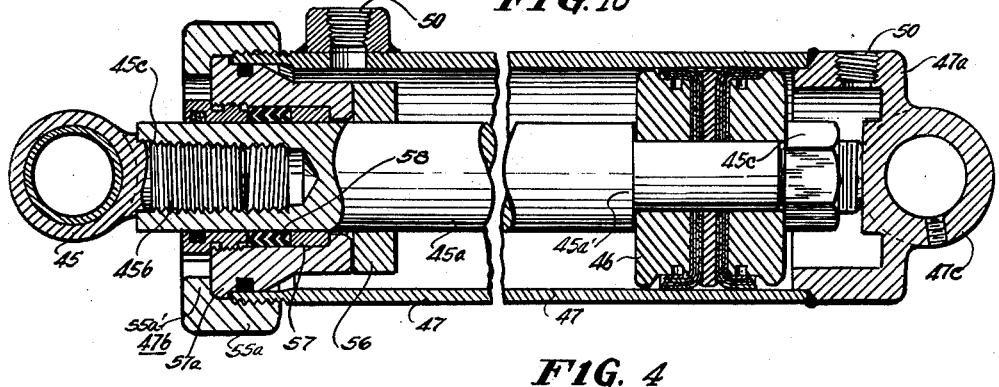
Fig. 10 is a fragmentary section on the line 10—10 of Fig. 9, enlarged.

The rear head 47a for the cylinder 47 is preferably cup shaped and welded to the adjacent end of the cylinder wall and the liquid inlet and outlet 50 for the adjacent end of the cylinder is formed in the side wall of the head 47a. As shown in Fig. 10, the inner end portion of the piston rod 45a is reduced to provide a shoulder 45a' against which the piston 46 is secured by a nut 45c threaded on the rod, the rear end of the rod being arranged to engage the rear head 47a so as to space the piston 46 therefrom when it is moved inwardly and thus permit the liquid, when supplied to the adjacent end of the cylinder, to apply pressure to the adjacent side of the piston. The front or outer cylinder head 47b consists of inner and outer elements 55, 55a, removably secured to the adjacent end of the cylinder wall, so that a collar 56 may be removably mounted on the piston rod 45a between the inner element 55 and the piston 46. The collar 56 serves to limit the stroke of the piston 46; accordingly, by substituting a collar of different length (that is, axially of the rod 45a), the piston stroke may be increased or decreased, the effect of which is to control the movement of the chain 37 and the latter in turn to rotate the carrier a predetermined distance, whereby the latter may be positioned horizontally or vertically (see Fig. 4a) or at an inclined position (see Fig. 12). The inner wall of the inner head element 55 is formed with a recess 57 to accommodate a suitable gland 58 and its outer end is provided with a shoulder 57a which engages with and is secured to the adjacent end of the cylinder wall by the outer head element 55a. The outer head element 55a consists of an annular member having an inwardly extending flange 55a', which engages the inner head element 55, and an internally threaded wall threaded on the end portion of the cylinder wall. The liquid inlet and outlet opening 56 for the outer end of the cylinder 47 is formed in its wall inwardly of the head element 55a, the outer wall of the inner element 55 being reduced to permit flow of the liquid into and out of the cylinder.

It will be observed that the boss 45 may be disconnected from the power operated member 39 and the boss 45 may be detached from the piston rod 45a; so that upon disassembly of the head elements 55, 55a, the device 56 for limiting or regulating the piston stroke may be removed and another device substituted therefor.

Figure 4:
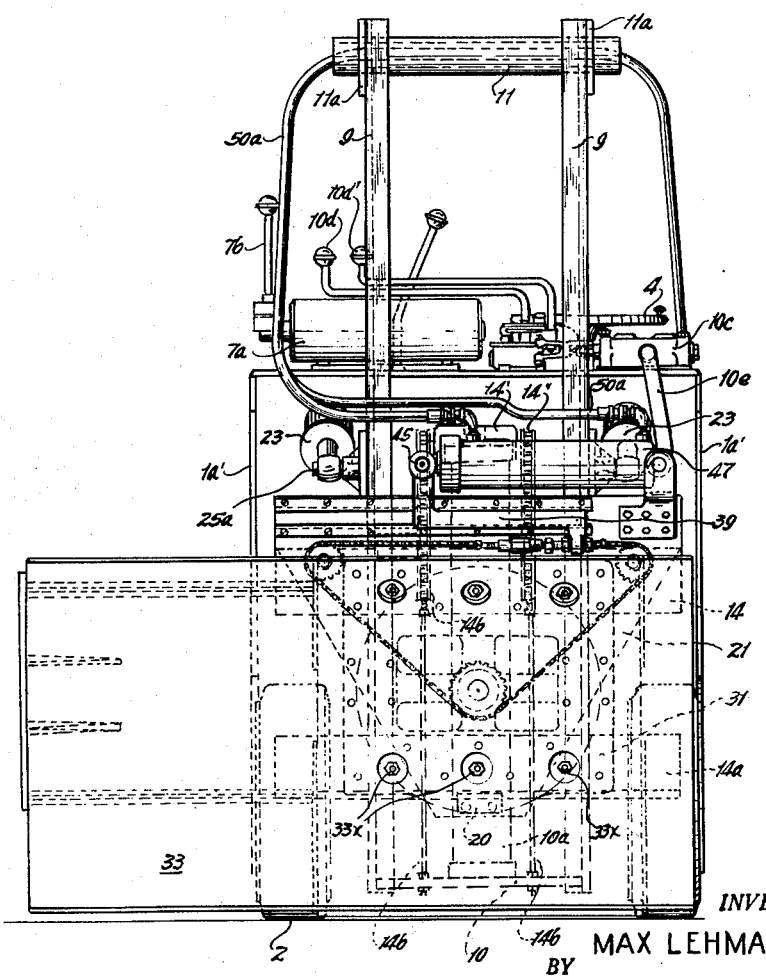
Fig. 4 is an end elevation looking toward the left of Figs. 1 and 3.

The load carrier 33 as shown in Figs. 1, 2, 3, 4, 4a, 5, 6 and 7 is shaped to handle round-shaped bodies, such as paper rolls (one being shown at A in Fig. 4a), and consists of an elongated plate 33a of general arcuate shape having at its lower end an outwardly extending substantially horizontal projection 33b which may be projected below the roll A when the latter is to be transported. In carrying out a loading operation, the truck is operated to position the projection 33b below a roll A and thereafter the mechanism 14x is tilted to the position shown in Fig. 2 and then transported while maintained in this position. By preference, the plate 33a and projection 33b are formed separately; the latter being extended rearwardly and connected to an upwardly extending plate 33b' which is suitably secured to the rear side of the plate 33a. In this arrangement the lower end of the plate 33a has a contiguous relation to the projection 33b. The plate 33b' is removably secured by bolts 33x (see Fig. 6) to the wall 31, the plate 33a being formed with openings to permit access to the bolts. To provide for the loading, transportation and/or discharge of the rolls when the latter are positioned on their ends, the plate 33a is provided at one end with a supporting member 59, disposed at substantially right angles to the plate. The inner end of the member 59 is welded to plate 33a and reinforcing ribs 59a welded to the rear side of the latter. Where the roll A to be transported is supported on one end, the truck is first operated to project the member 59 below the roll and then the mechanism 14x is operated to tilt the load carrier as already set forth. Fig. 1 illustrates in full lines the operation of loading a roll on the carrier; Fig. 2 shows the position of the carrier while the roll is being transported; whereas Fig. 1 illustrates in dotted lines the position of the carrier when the roll is to be discharged at a level above the flooring. As the load carrier is rotatably mounted, the rolls A may be engaged when positioned on their sides or ends and transported while supported in this position or if the carrier is loaded with the rolls in one position it may be operated to support the rolls in their other position for transportation and again rotated to their first position if desired. These operations are possible due to the fact that the load carrier may be rotated and raised and lowered, as shown in Fig. 4a.

Figure 11:
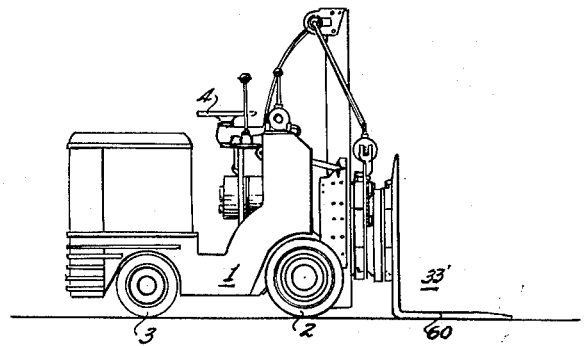
Fig. 11 is a view similar to Fig. 1 but showing a modification.
Figure 12:
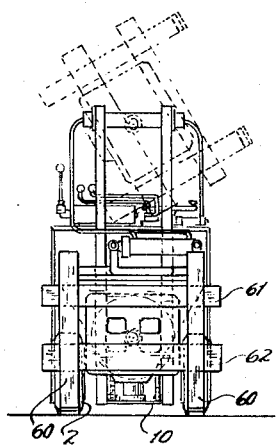
Fig. 12 is an end view of the truck shown in Fig. 11, the carrier being elevated and rotated into load discharge position.

Figs. 11, 12 and 13 illustrate a modification wherein the rotatable mechanism may be provided with means for supporting different types of load carriers, dependent on the shape of the loads, the load carrier 33' shown for illustrative purposes consisting of a pair of L-shaped bars 60. In this form of construction the outer wall 31 is provided with spaced upper and lower cross members 61, 62, removably secured thereto. The upper side edge of the upper member 61 is cutaway from end to end to provide an up-standing wall 61a and the lower side edge of the lower member 62 is cut-away from end to end to provide a depending wall 62a. 63, 64, indicate spaced upper and lower key elements suitably fixed to the upright sections of the L-shaped bars 60 and provided with inwardly disposed walls 63a, 64a, respectively, slidably and removably engaging the walls 61a, 62a, respectively, so as to support the bars 60 on the cross members 61, 62. The key members 63, 64, are slidable endwise of the cross members 61, 62, to position the carrier 33' on the wall 31. When the carrier 33' is mounted on the wall 31, it may be rotated to any desired position to effect dumping of the load as shown in dotted lines in Fig. 12.

Fig. 14 illustrates a modified construction wherein the power means for rotating the load carrier consists of a reversible electric motor 65, which is supplied with current from the batteries 6'. The motor 65 is rigidly supported on a bracket 66, which is fixed to the wall 21. The extended end portion of the motor shaft is drivingly connected through a suitable reduction gearing 67 to one end of a feed screw 68. The reduction gearing 67 is mounted in a suitable sectional housing 67a, the inner section of which is integrally connected to the outer end of the bracket 66. The inner end of the feed screw 68 is mounted in bearings provided in the housing 67a and held against endwise movement and extends outwardly therefrom for engagement with a nut 69 carried by the upper end of the arm 39b, which extends upwardly from the power member 39. Accordingly, when the motor 65 is driven to rotate the screw 68, it operates through the nut 69 to move the member 39 in its guides 44, so that the chain may be operated to rotate the load carrier in one direction and then return it to its first position. The nut 69 is formed in sections to permit its assembly on the feed screw 68. When an electric motor is employed to operate the load carrier, a suitable controller, instead of the valve mechanism 51, is mounted in a convenient position to control the supply of current to the motor.

From the foregoing description it will be observed that the rotatable mounting for the load carrier consists of few parts in side by side relation to support the carrier in close relation to the elevating member and hence minimize the overhang thereof relative to the front wheels 2.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. An attachment for an industrial truck provided with an elevating member, consisting of a support adapted to be secured to the elevating member, a member rotatably mounted on said support and adapted to support a load carrier, a cylinder mounted on said support and having connections at its opposite ends for the supply of fluid under pressure thereto, a piston reciprocatable in said cylinder, and driving connections between said piston and said rotatable member for rotating the latter, said driving connections consisting of a shaft fixed to said rotatable member, a sprocket fixed to said shaft, spaced sprockets mounted on said support, an endless chain engaging said sprockets and a connection between said piston and said chain for driving it in either direction.

2. An attachment as claimed in claim 1 wherein said cylinder is provided with a replaceable device to control the stroke of said piston.

3. In an industrial truck, the combination with a wheel supported frame and a power operated elevating member mounted on said frame, of a support fixed to said elevating member, a member rotatably mounted on said support, a load carrier mounted on said rotatable member, a shaft on and extending inwardly from said rotatable member, a sprocket fixed to said shaft, a pair of spaced sprockets on said support above said first mentioned sprocket, an endless chain engaging said sprockets, a cylinder on said support in substantially parallel relation to the run of said chain between said pair of sprockets and having connections at its opposite ends adapted to be connected with a source of liquid supply under pressure, a piston reciprocatable in said cylinder, a rod connected to said piston, and a connection between said rod and said chain.

4. In a truck, the combination with a wheel mounted frame, of a pair of upright guide members spacedly mounted on said frame, a hollow member fixed to the upper ends of said guide members, an elevating member slidably mounted on said guide members, a load carrying mechanism mounted on said elevating member and consisting of a load carrier arranged to rotate relative to said elevating member and hydraulically operated means supported on said member and operatively connected to said carrier, a source of liquid supply under pressure mounted on said frame, and flexible supply and discharge pipes between said source of liquid supply and the cylinder for said hydraulically operated means, the intermediate portions of said pipes being mounted in and extending through said hollow member.

5. In an industrial truck, the combination with a frame and driven and steerable wheels for supporting said frame, of an elevating member slidably mounted on said frame, means for raising said member, a load carrier, means on said frame for supplying fluid under pressure, and means between said elevating member and said carrier for rotatably supporting the latter, said means consisting of a support fixed to said elevating member and a wall rotatably mounted on said support for supporting said load carrier, a cylinder mounted on said support and having connections at its opposite ends with said source of fluid supply, a piston reciprocatable in said cylinder, power transmitting means between said piston and said rotatable wall, and a removable device in said cylinder for controlling the stroke of said piston.

6. In an industrial truck, the combination with a frame and driven and steerable wheels for supporting said frame, of an elevating member slidably mounted on said frame, means for raising said member, a load carrier, mechanism between said elevating member and said carrier for rotatably supporting and operating the latter, said mechanism including hydraulically operated cylinder-piston elements, one of which elements is operatively connected to said carrier, means on said frame for supplying liquid under pressure to said cylinder element, and means in said cylinder element for controlling the stroke of said piston element.

7. In an industrial truck, the combination with a frame and driven and steerable wheels for supporting said frame, of an elevating member slidably mounted on said frame, means for raising said member, a load carrier, means on said frame for supplying fluid under pressure, means between said elevating member and said carrier for rotatably supporting the latter, said means consisting of a support fixed to said elevating member and a wall rotatably mounted on said support for supporting and operating said load carrier, a cylinder mounted on said support and having connections at its opposite ends with said source of fluid supply, one head of said cylinder being removable and a piston reciprocatable in said cylinder and connected to a rod extending through said removable cylinder head, and a removable collar on and slidably fitting said rod between said piston and said removable head.

MAX LEHMANN.

REFERENCES CITED

The following references are of record in the file of this patent:

UNITED STATES PATENTS

| Number | Name | Date |
| --- | --- | --- |
| 1,878,994 | Abbe | Sept. 27, 1932 |
| 1,903,775 | Christopher | Apr. 18, 1933 |
| 2,281,004 | Lehmann et al. | Apr. 28, 1942 |
| 2,287,469 | Cochran | June 23, 1942 |
| 2,335,572 | Schroeder | Nov. 30, 1943 |
| 2,368,122 | Dunham | Jan. 30, 1945 |
| 2,411,263 | Guerin et al. | Nov. 19, 1946 |
| 2,413,661 | Stokes | Dec. 31, 1946 |